US012691700B2

(12) United States Patent
Himeno et al.

(10) Patent No.: US 12,691,700 B2
(45) Date of Patent: Jul. 28, 2026

(54) PRINTING APPARATUS AND METHOD FOR PRODUCING PRINTED MATTER

(71) Applicant: SEIKO EPSON CORPORATION, Tokyo (JP)

(72) Inventors: Tsuyoshi Himeno, Matsumoto (JP); Toshihiro Hayashi, Matsumoto (JP); Daisuke Shinohara, Shiojiri (JP); Ayako Kobayashi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 174 days.

(21) Appl. No.: 18/438,553

(22) Filed: Feb. 12, 2024

(65) Prior Publication Data

US 2024/0270005 A1 Aug. 15, 2024

(30) Foreign Application Priority Data

Feb. 13, 2023 (JP) ................................ 2023-019687

(51) Int. Cl.
*B41J 29/387* (2006.01)
*B41J 15/04* (2006.01)
*B41J 15/16* (2006.01)

(52) U.S. Cl.
CPC ............ *B41J 29/387* (2013.01); *B41J 15/04* (2013.01); *B41J 15/16* (2013.01)

(58) Field of Classification Search
CPC . B41J 15/02; B41J 15/04; B41J 15/042; B41J 15/16; B41J 29/387; B41J 11/0095
USPC .......................................................... 347/16
See application file for complete search history.

(56) References Cited

U.S. PATENT DOCUMENTS 10,137,709 B2 * 11/2018 Hamano .............. B41J 13/0036
2016/0191720 A1 * 6/2016 Yamaguchi ............ B41J 11/663 358/1.12
2021/0101395 A1 * 4/2021 Sugiyama ............ B41J 11/0095
2021/0197596 A1 7/2021 Washio et al.
2022/0288950 A1 9/2022 Tani

FOREIGN PATENT DOCUMENTS

CN 113696627 A 11/2021
JP 2017-071184 A 4/2017
JP 2019-098595 A 6/2019
JP 2021-104589 A 7/2021

OTHER PUBLICATIONS

JP 2019098595 machine translation. (Year: 2025).*

* cited by examiner

*Primary Examiner* — Stephen D Meier
*Assistant Examiner* — Thomas Ray Knief
(74) *Attorney, Agent, or Firm* — Spencer Fane LLP

(57) ABSTRACT

A printing apparatus includes: a printing unit configured to perform printing on a medium; a conveyance unit configured to convey the medium; a winding unit configured to wind up the medium after printing; and a stopping unit configured to stop conveyance of the medium by the conveyance unit in response to a break of a printed image reaching a printing position in the printing unit in a state where a leading end of the medium is located in a fixing work range.

11 Claims, 12 Drawing Sheets

PRINTING APPARATUS AND METHOD FOR PRODUCING PRINTED MATTER

The present application is based on, and claims priority from JP Application Serial Number 2023-019687, filed Feb. 13, 2023, the disclosure of which is hereby incorporated by reference herein in its entirety.

BACKGROUND

1. Technical Field

The present disclosure relates to a printing apparatus and a method for producing a printed matter.

2. Related Art

JP-A-2021-104589 discloses a printer that automatically winds up and collects paper after printing.

JP-A-2021-104589 is an example of the related art.

In JP-A-2021-104589, it is required to fix a leading end of the paper to a winding core material in advance before starting the printing. Therefore, a large amount of paper is inevitably consumed every time the printing is started.

Therefore, in order to reduce the consumption of the paper, it is conceivable to fix the leading end of the paper to the winding core material only after the printing is started and at a time point when the leading end of the paper reaches the winding core material, instead of fixing the leading end of the paper to the winding core material in advance before starting the printing. In this case, since it takes a certain amount of time for the leading end of the paper to reach the winding core material, it is conceivable that a user may perform another work to spend the time.

However, the user may forget that the printing is in progress due to devotion in another work. Here, when the paper fed out from the printer reaches a floor, the paper becomes dirty, and thus the paper after the printing inevitably becomes waste paper. Even before the paper reaches the floor, when the leading end of the paper passes the winding core material by a large amount, the paper is required to be folded up, making a work of fixing the leading end of the paper to the winding core material difficult. Therefore, as above, the paper after the printing becomes waste paper.

SUMMARY

According to a first aspect of the present disclosure, a printing apparatus is provided. The printing apparatus includes: a printing unit configured to perform printing on a medium; a conveyance unit configured to convey the medium; a winding unit configured to rotatably support a winding core material for winding up the medium after printing; and a stopping unit configured to stop conveyance of the medium by the conveyance unit in response to a break of a printed image reaching a printing position in the printing unit after a leading end of the medium reaches an upstream end of a fixing work range suitable for a user to fix the leading end of the medium to the winding core material.

According to a second aspect of the present disclosure, a method for producing a printed matter is provided. The method for producing a printed matter is a method for producing a printed matter in a printing apparatus including a printing unit configured to perform printing on a medium, a conveyance unit configured to convey the medium, and a winding unit configured to rotatably support a winding core material for winding up the medium after printing. The method includes: stopping conveyance of the medium by the conveyance unit in response to a break of a printed image reaching a printing position in the printing unit after a leading end of the medium reaches an upstream end of a fixing work range suitable for a user to fix the leading end of the medium to the winding core material.

DESCRIPTION OF EMBODIMENTS

Figure 1:
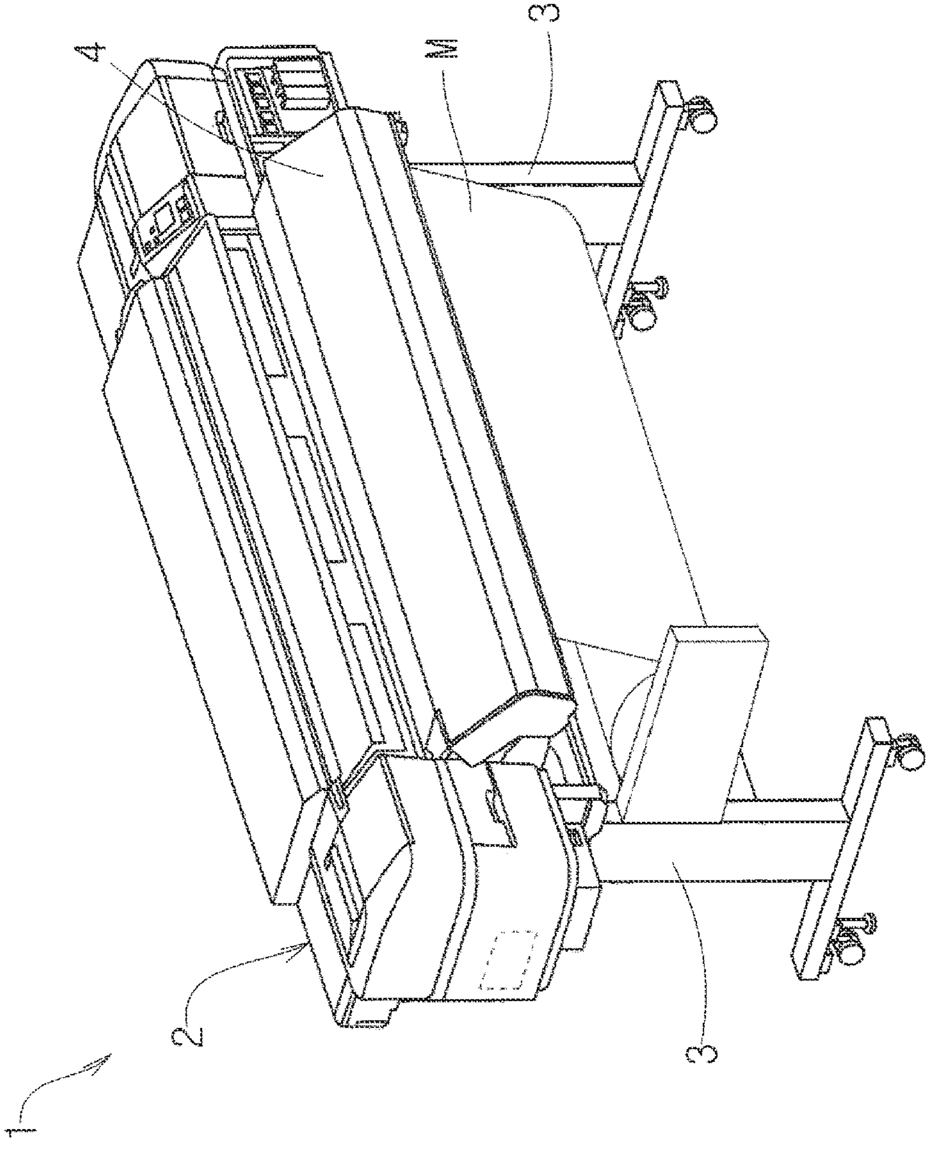
FIG. 1 is an external perspective view of a printing apparatus.
Figure 2:
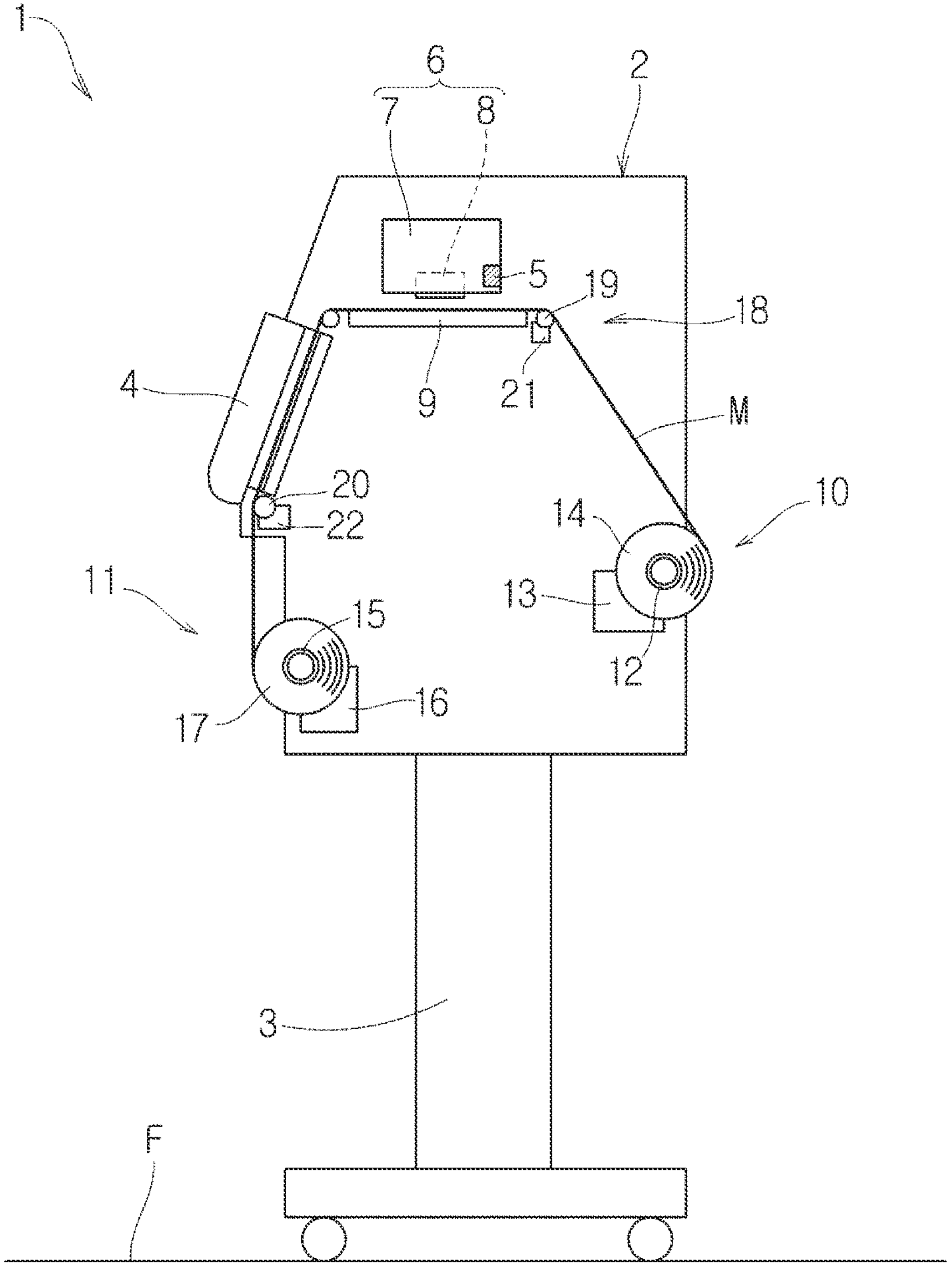
FIG. 2 is a side view of the printing apparatus.

Hereinafter, a printing apparatus 1 according to the present disclosure will be described with reference to FIGS. 1 and 2. The printing apparatus 1 shown in FIGS. 1 and 2 is, for example, an inkjet large-format printer that performs printing on a medium M such as paper by ejecting ink in a liquid state. The large-format printer is, for example, a printer capable of performing printing on the medium M having a short-side width of 297 mm or more. Hereinafter, a short-side direction of the medium M is referred to as a main scanning direction. A direction orthogonal to the main scanning direction is referred to as a sub scanning direction.

1. Outline of Printing Apparatus 1

As shown in FIG. 1, the printing apparatus 1 includes a main body portion 2 and a pair of leg portions 3. The pair of leg portions 3 each extend downward from the main body portion 2. The main body portion 2 has a substantially rectangular parallelepiped shape, and is provided with a drying unit 4 on a front surface side thereof.

As shown in FIG. 2, the main body portion 2 includes a guide rail 5 extending in the main scanning direction. The guide rail 5 guides a printing unit 6 such that the printing unit 6 can reciprocate along the guide rail 5 in the main scanning direction. The main body portion 2 is further provided with a main scanning feed mechanism for reciprocating the printing unit 6 along the guide rail 5. Typically, the main scanning feed mechanism includes an endless belt coupled to the printing unit 6 and a drive motor that drives the endless belt. The printing unit 6 includes a carriage 7 and a head 8. The head 8 includes a plurality of nozzles capable of ejecting ink downward. A flat platen 9 extending in the main scanning direction is provided below the printing unit 6. The printing unit 6 according to the embodiment employs a serial head method in which the head 8 reciprocates in the main scanning direction, or may alternatively employ a line head method in which the head 8 extends over substantially the same range as a width dimension of the medium M.

The main body portion 2 further includes a paper feeding unit 10 provided on a back side of the main body portion 2, and a winding unit 11 provided on a front side of the main body portion 2 and below the drying unit 4.

The paper feeding unit 10 includes a support mechanism that rotatably supports a paper feeding core material 12, and a paper feeding motor 13 that rotationally drives the paper feeding core material 12. A paper feeding roll 14 is formed on an outer periphery of the paper feeding core material 12. The paper feeding motor 13 is torque-controlled so as to apply back tension to the medium M unwound from the paper feeding roll 14. The paper feeding core material 12 is typically a paper tube.

The winding unit 11 includes a support mechanism that rotatably supports a winding core material 15 and a winding motor 16 that rotationally drives the winding core material 15. A winding roll 17 is formed on an outer periphery of the winding core material 15. The winding motor 16 is torque-controlled so as to apply front tension to the medium M to be wound around the winding core material 15. The winding core material 15 is typically a paper tube, but is not limited thereto, and may be a resin tube or the like.

The main body portion 2 further includes a conveyance unit 18 that conveys the medium M. The conveyance unit 18 includes a first conveyance roller 19 provided upstream of the platen 9 and a second conveyance roller 20 provided downstream of the drying unit 4. The conveyance unit 18 further includes a first conveyance motor 21 that rotationally drives the first conveyance roller 19, and a second conveyance motor 22 that rotationally drives the second conveyance roller 20.

The printing apparatus 1 is installed on an installation floor surface F.

With the above configuration, the medium M is pulled out from the paper feeding roll 14 of the paper feeding unit 10, undergoes printing in the printing unit 6 while being conveyed by the conveyance unit 18, passes through the drying unit 4, and is wound around the winding core material 15 of the winding unit 11.

2. Problem to be Solved

Figure 3:
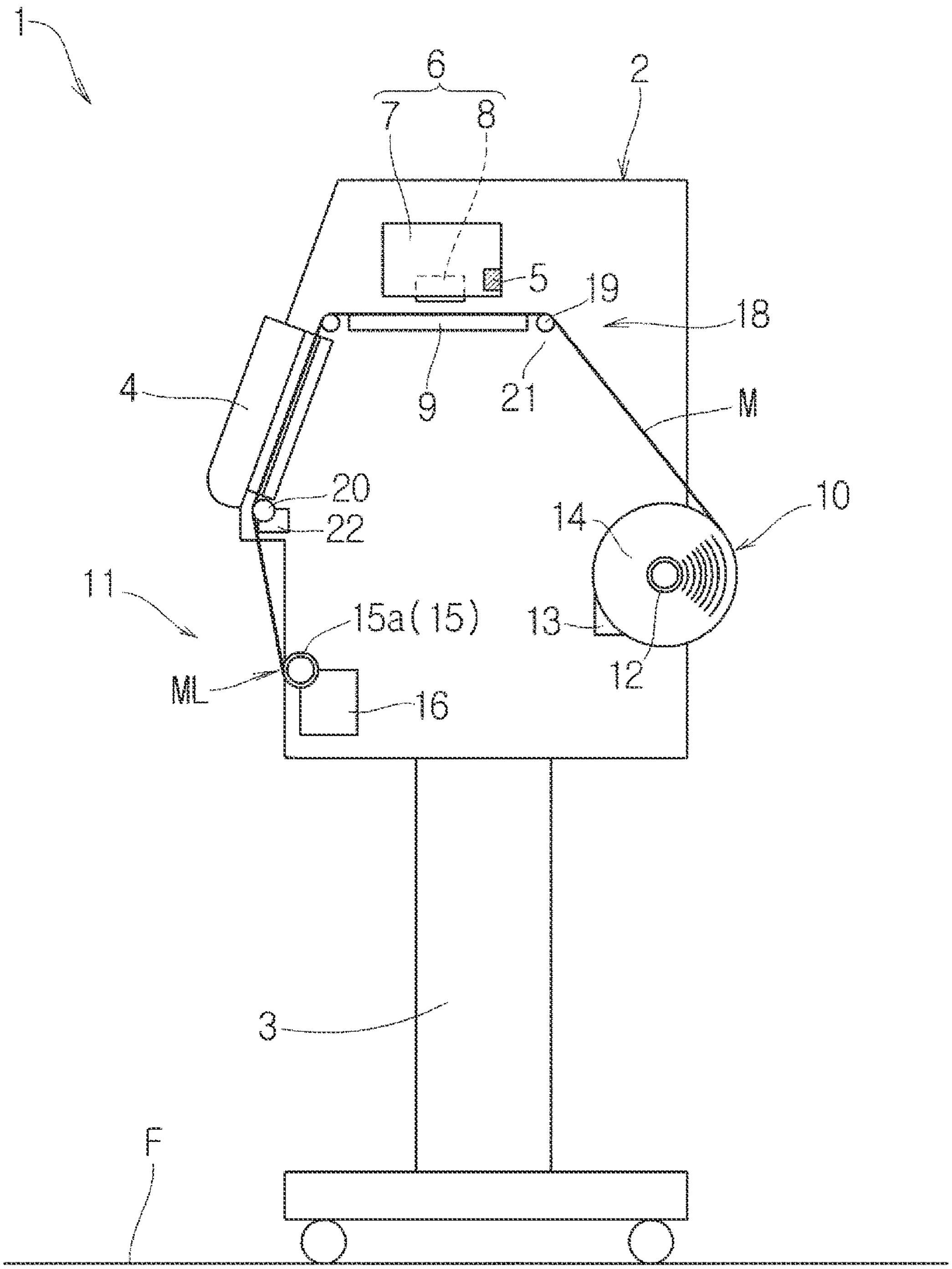
FIG. 3 is a side view of the printing apparatus.
Figure 4:
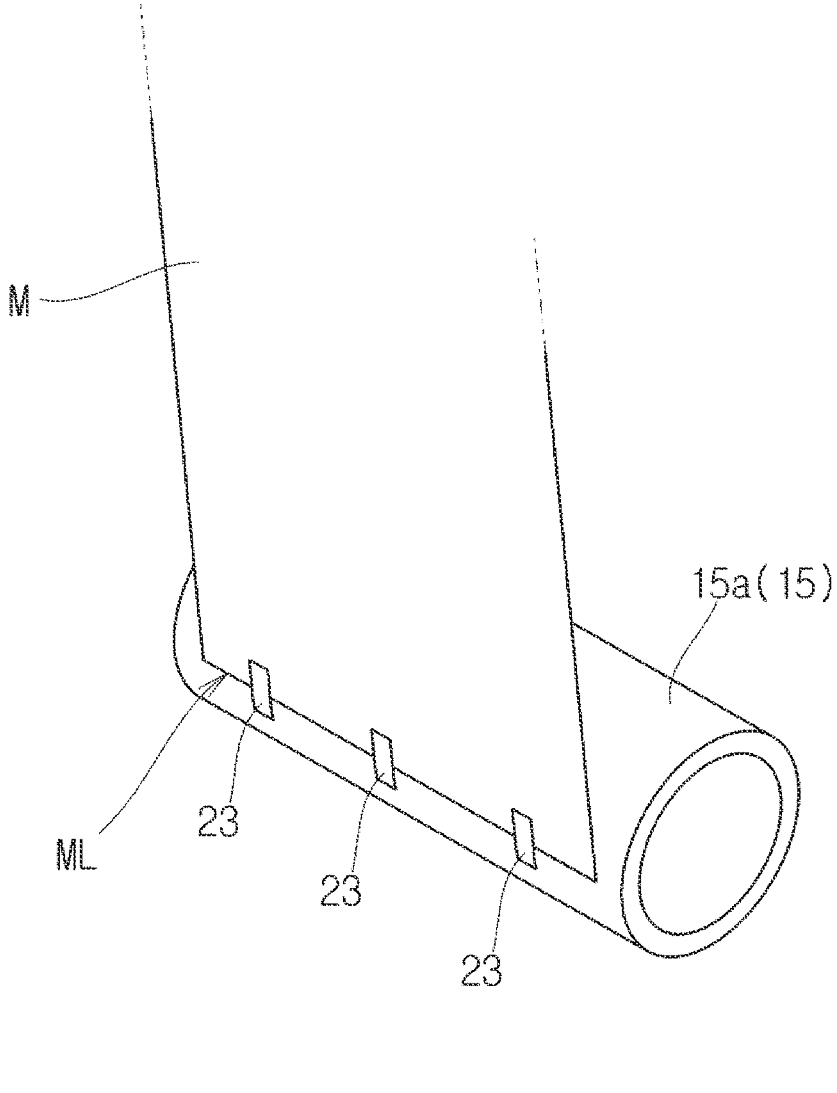
FIG. 4 is a perspective view of a winding core material to which a leading end of a medium is fixed.

In the printing apparatus 1 described above, in order to wind the medium M around the winding core material 15, as shown in FIGS. 3 and 4, it is required to fix a leading end ML of the medium M in a conveyance direction to an outer peripheral surface 15*a* of the winding core material 15. As shown in FIG. 4, the leading end ML of the medium M is typically fixed to the outer peripheral surface 15*a* of the winding core material 15 using several tape pieces 23. A method of fixing the leading end ML of the medium M to the outer peripheral surface 15*a* of the winding core material 15 is not limited to the above. The leading end ML of the medium M may be fixed to the outer peripheral surface 15*a* of the winding core material 15 using a quick-drying adhesive instead of the tape pieces 23 described above. The leading end ML of the medium M may be fixed to the outer peripheral surface 15*a* of the winding core material 15 by clamping the leading end ML of the medium M with a clamp mechanism provided on the outer peripheral surface 15*a* of the winding core material 15.

As shown in FIG. 3, when the leading end ML of the medium M is fixed to the outer peripheral surface 15*a* of the winding core material 15 before starting printing, the medium M ahead of a printing position becomes waste paper every time the printing is started. As the printing is repeated, the waste paper accumulates, and a large amount of the medium M is inevitably consumed.

Therefore, it is conceivable that, in order to reduce the consumption of the medium M, the leading end ML of the medium M is fixed to the winding core material 15 only at a time point when the leading end ML of the medium M reaches the winding core material 15 after the printing is started, instead of fixing the leading end ML of the medium M to the winding core material 15 in advance before the printing is started. In this case, since it takes a certain amount of time for the leading end ML of the medium M to reach the winding core material 15, it is conceivable that a user may perform another work to spend the time.

However, the user may forget that the printing is in progress due to devotion in another work. Here, when the leading end ML of the medium M reaches the installation floor surface F without the medium M fed out from the main body portion 2 being wound by the winding unit 11, the medium M becomes dirty, and thus the medium M after the printing inevitably becomes waste paper. Even before the medium M reaches the installation floor surface F, when the leading end ML of the medium M passes the winding unit 11 by a large amount, the medium M is required to be folded up, making a work of fixing the leading end ML of the medium M to the winding core material 15 difficult.

Therefore, the printing apparatus 1 according to the embodiment has a completely novel configuration, which is not achieved in the related art, in order to solve the above problem. Hereinafter, a printing system 100 will be described with reference to FIG. 5. The printing system 100 includes the printing apparatus 1 and a computer 30. The printing apparatus 1 and the computer 30 are connected to each other by wire or wirelessly. The computer 30 outputs printing output data to the printing apparatus 1. The printing apparatus 1 performs main scanning and sub scanning based on the printing output data received from the computer 30. Here, the main scanning means forming an image on the medium M by ejecting ink onto the medium M while reciprocating the printing unit 6 in the main scanning direction. The sub scanning means conveying the medium M in the direction perpendicular to the main scanning direction.

3. Computer 30

The computer 30 includes a central processing unit (CPU) 30*a*, a random access memory (RAM) 30*b*, a read only memory (ROM) 30*c*, and a hard disc drive (HDD) 30*d*. The computer 30 further includes a communication interface 30*e* and a liquid crystal display (LCD) 30*f*. The computer 30 communicates with the printing apparatus 1 via the communication interface 30*e*. When the CPU 30*a* reads out and executes a program stored in the HDD 30*d*, the program causes hardware such as the CPU 30*a* to function as an application 31 and a printer driver 32.

The application 31 generates image data to be printed on the large-format medium M in accordance with a drawing instruction from the user. The application 31 outputs the image data to the printer driver 32 in accordance with a printing instruction from the user.

The printer driver 32 includes a color conversion unit 33, a halftone processing unit 34, and a rasterization processing unit 35.

The color conversion unit 33 converts color components of the image data from an RGB format to a CMYK format by referring to a color conversion lookup table. The halftone processing unit 34 performs halftone processing on the image data to convert ink amount data into two-gradation dot data representing the presence or absence of dot formation. The rasterization processing unit 35 executes rasterization processing of adjusting the dot data generated by the halftone processing to match a main scanning pass of the head 8. The rasterization processing unit 35 outputs to the printing apparatus 1 the printing output data including the dot data after the rasterization processing and a sub scanning feed amount.

Figure 6:
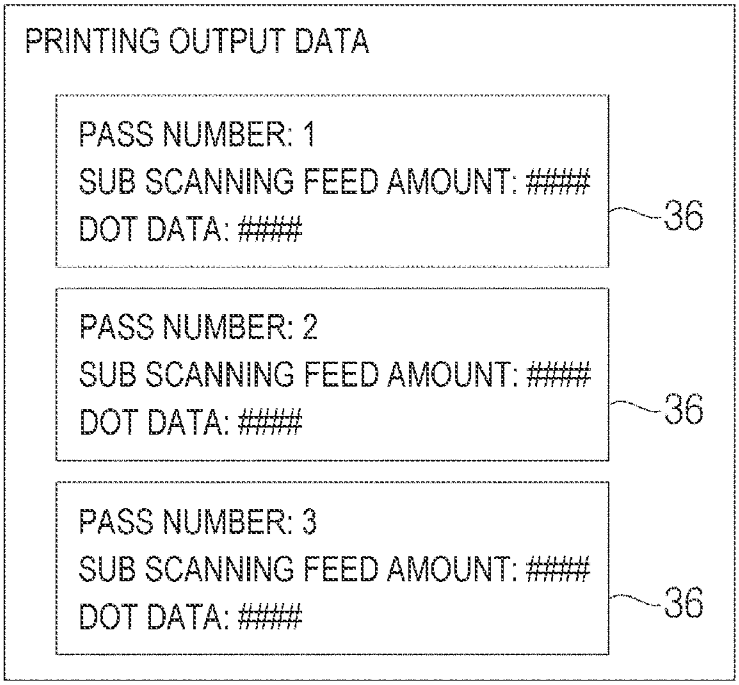
FIG. 6 is a data structure diagram of printing output data.

FIG. 6 shows an example of the printing output data. As shown in FIG. 6, the printing output data includes a plurality of pieces of main scanning pass data 36. Each main scanning pass data includes a pass number, the sub scanning feed amount, and the dot data for the main scanning pass. The plurality of pieces of main scanning pass data 36 are sequentially executed in accordance with the pass number. For example, when executing the main scanning pass data 36 whose pass number is one, the main scanning is executed based on the dot data included in the main scanning pass data 36, and when the main scanning is completed, the sub scanning is executed based on the sub scanning feed amount included in the main scanning pass data 36.

Figure 5:
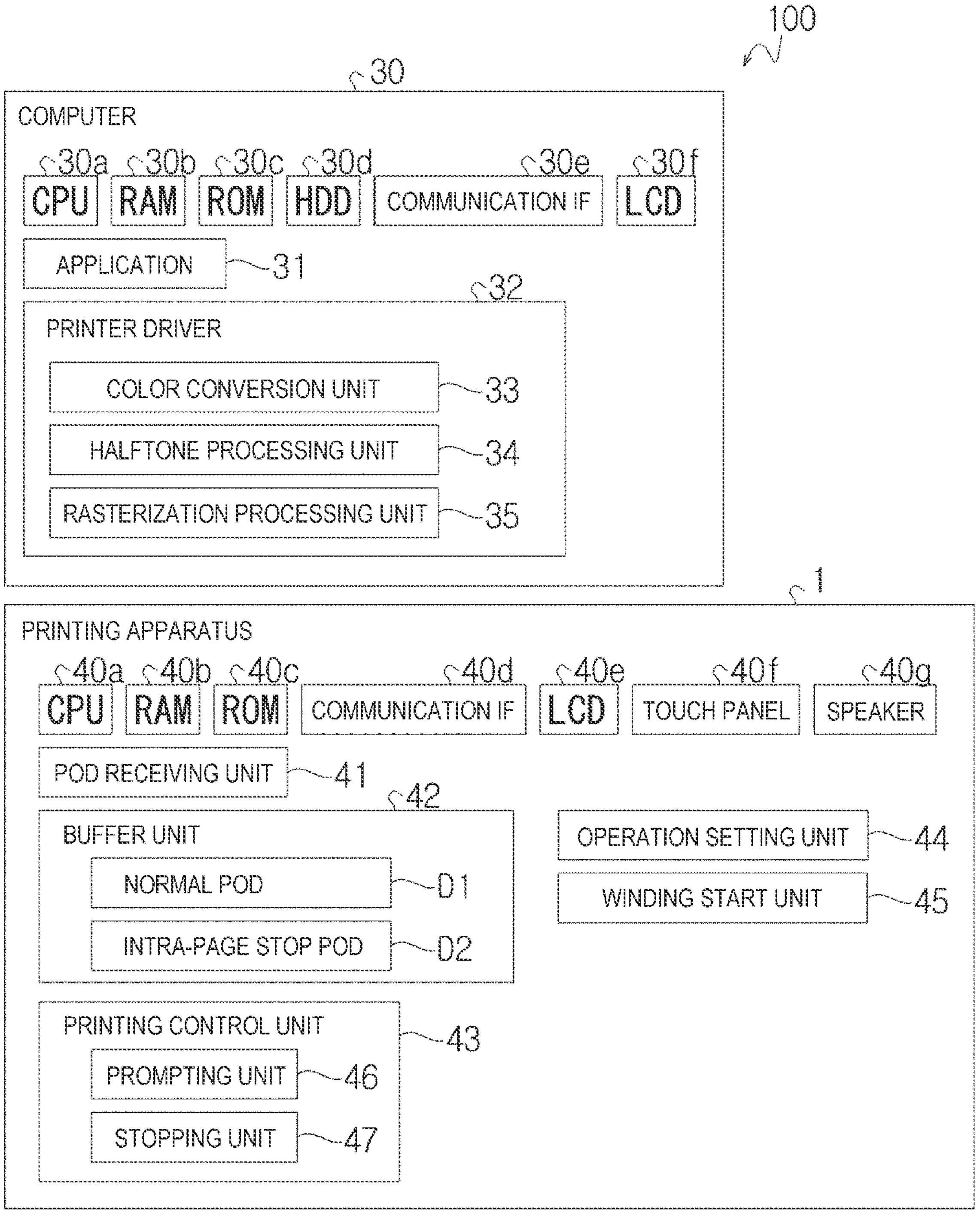
FIG. 5 is a functional block diagram of a printing system.

In the embodiment, the printer driver 32 generates two types of printing output data. The two types of printing output data include normal printing output data D1 and intra-page stop printing output data D2. FIG. 5 shows the normal printing output data D1 and the intra-page stop printing output data D2 that are stored in the printing apparatus 1 as a result of the printer driver 32 outputting the printing output data to the printing apparatus 1. In FIG. 5, "POD" is an abbreviation of printing output data.

Figure 7:
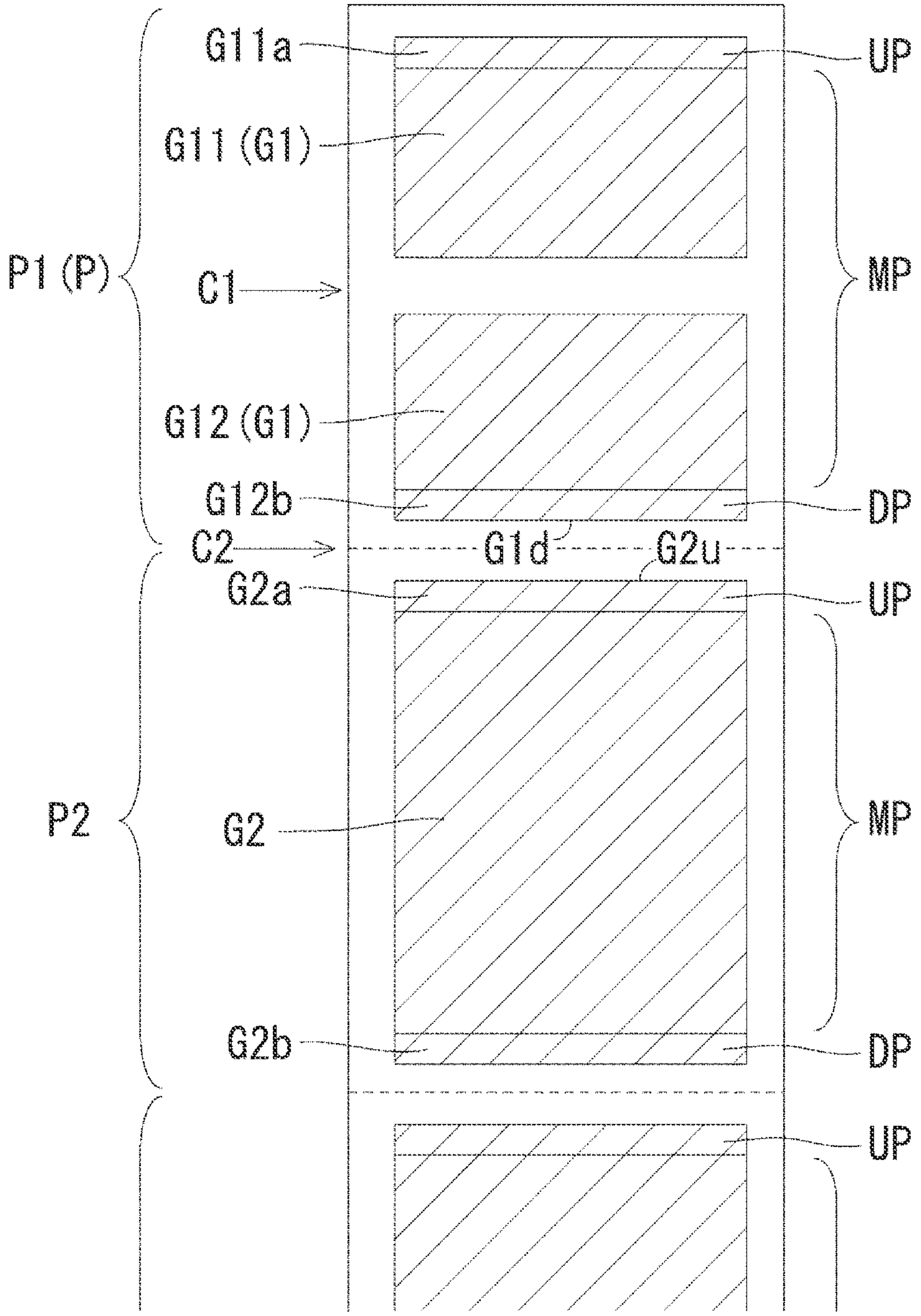
FIG. 7 is a diagram showing image data output from an application.
Figure 8:
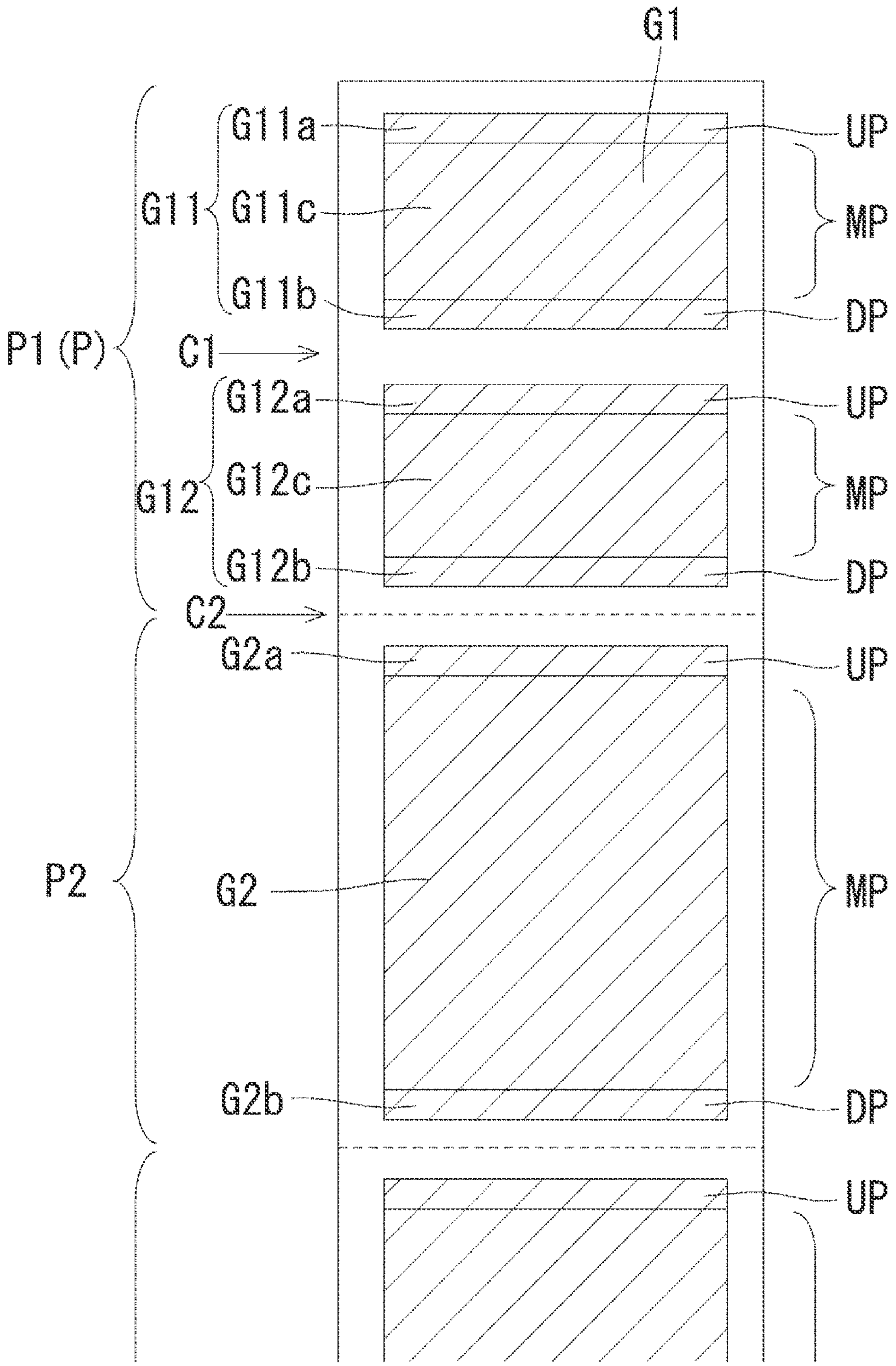
FIG. 8 is a diagram showing image data output from the application.

Hereinafter, the normal printing output data D1 and the intra-page stop printing output data D2 will be described with reference to FIGS. 7 and 8. FIGS. 7 and 8 show the image data that the application 31 outputs to the printer driver 32.

As shown in FIG. 7, the image data output from the application 31 to the printer driver 32 includes a plurality of printing pages P. The plurality of printing pages P include a first printing page P1 and a second printing page P2.

As shown in FIG. 7, a printed image G1 in the first printing page P1 may include a printed image G11 and a printed image G12 that are separated from each other in the conveyance direction of the medium M. The printed image G11 is a printed image on an upper end side of the first printing page P1. The printed image G12 is a printed image on a lower end side of the first printing page P1. An upper end of the first printing page P1 corresponds to a downstream end of the first printing page P1 in the conveyance direction of the medium M. A lower end of the second printing page P2 corresponds to an upstream end of the first printing page P1 in the conveyance direction of the medium M. A break C1 of the printed image G1 exists between the printed image G11 and the printed image G12. The break C1 is an area between the printed image G11 and the printed image G12, and is an area where printing is not performed over the entire area in the main scanning direction. A printed image G2 in the second printing page P2 is continuous without any break in the conveyance direction of the medium M. A break C2 exists between a lower end G1*d* of the printed image G1 in the first printing page P1 and an upper end G2*u* of the printed image G2 in the second printing page P2. Similar to C1, the break C2 is also an area where printing is not performed over the entire area in the main scanning direction.

Thus, the normal printing output data D1 is structured as follows, as shown in FIG. 7.

Upper end processing UP is performed on an upper end portion G11*a* of the printed image G11.

Intermediate processing MP is performed on an area between the upper end portion G11*a* and a lower end portion G12*b* of the printed image G11.

Lower end processing DP is performed on the lower end portion G12*b* of the printed image G12.

The upper end processing UP is performed on an upper end portion G2*a* of the printed image G2.

The intermediate processing MP is performed on an area between the upper end portion G2*a* and a lower end portion G2*b* of the printed image G2.

The lower end processing DP is performed on the lower end portion G2*b* of the printed image G2.

Here, the upper end processing UP and the lower end processing DP mean processing of performing printing with a sub scanning feed amount smaller than a sub scanning feed amount in the intermediate processing MP. The upper end processing UP, the lower end processing DP, and the intermediate processing MP are known techniques disclosed in, for example, JP-A-2021-123033, and thus a detailed description thereof will be omitted.

On the other hand, the intra-page stop printing output data D2 is structured as follows, as shown in FIG. 8.

Upper end processing UP is performed on an upper end portion G11*a* of the printed image G11.

The intermediate processing MP is performed on an intermediate portion G11*c* which is an area between the upper end portion G11*a* and the lower end portion G11*b* of the printed image G11.

The lower end processing DP is performed on the lower end portion G11*b* of the printed image G11.

The upper end processing UP is performed on an upper end portion G12*a* of the printed image G12.

The intermediate processing MP is performed on an intermediate portion G12*c* which is an area between the upper end portion G12*a* and the lower end portion G12*b* of the printed image G12.

Lower end processing DP is performed on the lower end portion G12*b* of the printed image G12.

The upper end processing UP is performed on an upper end portion G2*a* of the printed image G2.

The intermediate processing MP is performed on an area between the upper end portion G2*a* and a lower end portion G2*b* of the printed image G2.

The lower end processing DP is performed on the lower end portion G2*b* of the printed image G2.

The normal printing output data D1 and the intra-page stop printing output data D2 are used properly as follows. Here, in FIGS. 7 and 8, a dimension of the head 8 in the sub scanning direction is larger than a dimension of the break C1 in the sub scanning direction.

When printing is performed using the normal printing output data D1, a main scanning pass is executed in which ink is simultaneously ejected onto the lower end portion G11*b* of the printed image G11 and the upper end portion G12*a* of the printed image G12. In other words, the main scanning pass is executed over the lower end portion G11*b* of the printed image G11 and the upper end portion G12*a* of the printed image G12. In this case, when the conveyance of the medium M is stopped at a timing when the break C1 reaches the printing position in the printing unit 6, printing on the lower end portion G11*b* of the printed image G11 and printing on the upper end portion G12*a* of the printed image G12 are both left uncompleted. That is, immediately after stopping, the ink ejected onto the lower end portion G11*b* of the printed image G11 and the upper end portion G12*a* of the printed image G12 starts to dry. Thereafter, when the printing is resumed, the printing on the lower end portion G11*b* of the printed image G11 and the printing on the upper end portion G12*a* of the printed image G12 are performed such that liquid ink is newly superimposed on the ink that is already dried. As a result, printing quality at the lower end portion G11*b* of the printed image G11 and the upper end portion G12*a* of the printed image G12 may remarkably deteriorate.

On the other hand, when printing is performed using the intra-page stop printing output data D2, the printing on the lower end portion G11*b* of the printed image G11 is completed before the printing on the upper end portion G12*a* of the printed image G12 is started. Similarly, the printing on the upper end portion G12*a* of the printed image G12 starts after the printing on the lower end portion G11*b* of the printed image G11 is completed. Therefore, even when the conveyance of the medium M is stopped at the timing when the break C1 reaches the printing position in the printing unit 6, printing in which the liquid ink is newly superimposed on the ink that is already dried is not performed on the lower end portion G11*b* of the printed image G11 and the upper end portion G12*a* of the printed image G12.

In short, when the conveyance of the medium M is stopped at the timing when the break C1 reaches the printing position in the printing unit 6, remarkable deterioration of the printing quality at the lower end portion G11*b* of the printed image G11 and the upper end portion G12*a* of the printed image G12 can be prevented by using the intra-page stop printing output data D2.

4. Printing Apparatus 1

Returning to FIG. 5, the printing apparatus 1 includes a central processing unit (CPU) 40*a*, a random access memory (RAM) 40*b*, and a read only memory (ROM) 40*c*. The printing apparatus 1 further includes a communication interface 40*d*, an LCD 40*e*, a touch panel 40*f*, and a speaker 40*g*. The printing apparatus 1 communicates with the computer 30 via the communication interface 40*d*. The LCD 40*e* and the touch panel 40*f* are disposed to overlap each other. When the CPU 40*a* reads out and executes a program stored in the ROM 40*c*, the program causes hardware such as the CPU 40*a* to function as a printing output data receiving unit 41, a buffer unit 42, a printing control unit 43, an operation setting unit 44, and a winding start unit 45.

The printing output data receiving unit 41 receives the normal printing output data D1 and the intra-page stop printing output data D2 from the computer 30. The printing output data receiving unit 41 stores the received normal printing output data D1 and intra-page stop printing output data D2 in the buffer unit 42.

The printing control unit 43 executes the main scanning by the printing unit 6 and the sub scanning by the first conveyance motor 21 and the second conveyance motor 22 based on the normal printing output data D1 or the intra-page stop printing output data D2 stored in the buffer unit 42. The printing control unit 43 performs torque control on the paper feeding motor 13 and the winding motor 16.

The printing control unit 43 includes a prompting unit 46 and a stopping unit 47.

The prompting unit 46 prompts the user to fix the leading end ML of the medium M to the winding core material 15 in response to the leading end ML of the medium M reaching a prompting position located downstream of the printing position in the printing unit 6 after the printing unit 6 starts printing. In the embodiment, the prompting unit 46 executes the above prompting by outputting a prompting sound signal to the speaker 40*g*. A detailed operation of the prompting unit 46 will be described with reference to a flowchart to be described later. The prompting unit 46 may be one means for solving the above problem.

The stopping unit 47 stops the conveyance of the medium M by the conveyance unit 18 in response to the break of the printed image reaching the printing position in the printing unit 6 after the leading end ML of the medium M reaches an upstream end of a fixing work range suitable for the user to fix the leading end ML of the medium M to the winding core material 15. A detailed operation of the stopping unit 47 will be described with reference to a flowchart to be described later. The stopping unit 47 may be one means for solving the above problem.

Figure 9:
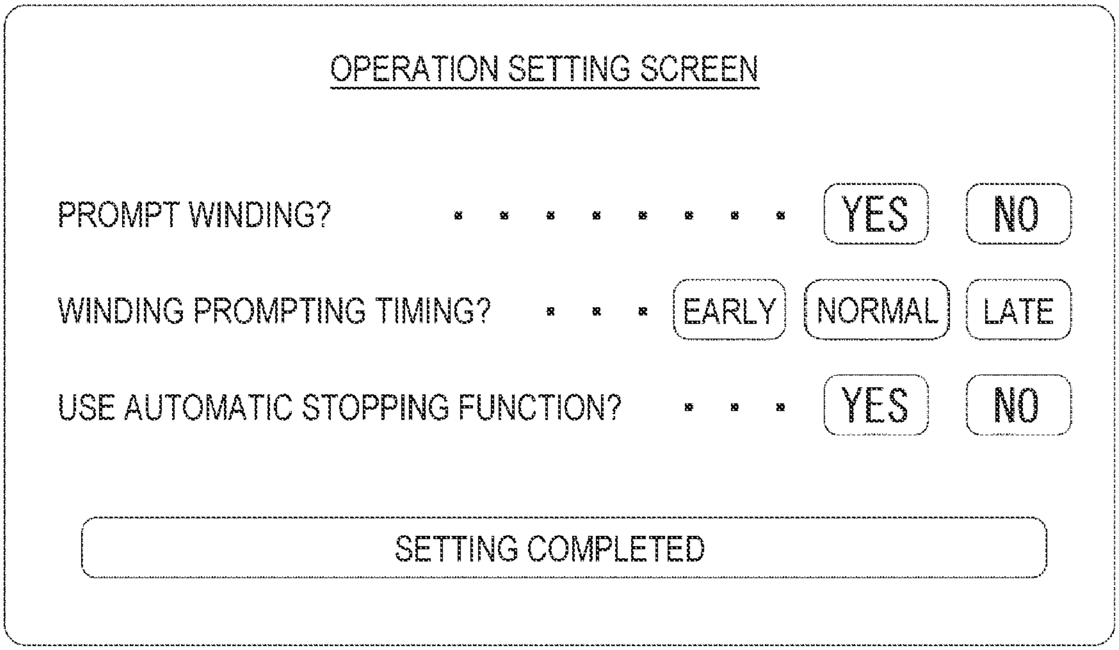
FIG. 9 is a diagram showing a display example of an operation setting screen.

The operation setting unit 44 causes the user to set operation conditions of the printing apparatus 1. FIG. 9 shows an example of an operation setting screen. The operation setting unit 44 causes the LCD 40*e* of the printing apparatus 1 to display the operation setting screen shown in FIG. 9, thereby causing the user to set the operation conditions of the printing apparatus 1. On the operation setting screen, (1) to (3), i.e., (1) a necessity of a winding prompting, (2) a winding prompting timing, and (3) a necessity of an automatic stopping function can be set. The winding prompting means a prompting by the prompting unit 46. The winding prompting timing is a timing at which the prompting unit 46 outputs a prompting sound signal to the speaker 40*g*. The automatic stopping function is a function by which the stopping unit 47 stops the conveyance of the medium M. The operation setting unit 44 stores, in the RAM 40*b*, the operation conditions of the printing apparatus 1 input by the user through the operation setting screen.

Figure 10:
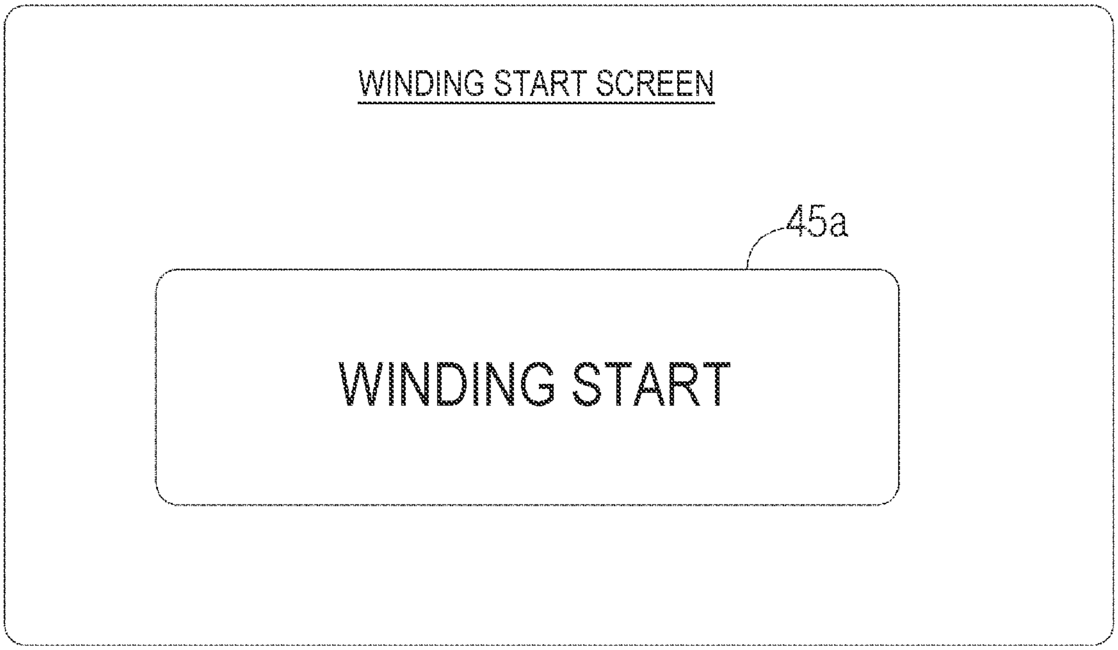
FIG. 10 is a diagram showing a display example of a winding start screen.

The winding start unit 45 provides the user with a trigger for starting winding by the winding unit 11. FIG. 10 shows an example of a winding start screen. The winding start unit 45 causes the LCD 40*e* of the printing apparatus 1 to display the winding start screen shown in FIG. 10, thereby providing the user with the trigger for starting winding by the winding unit 11. When the user taps a winding start button 45*a*, the winding start unit 45 outputs a winding start command to the printing control unit 43 such that the winding by the winding unit 11 starts. When receiving the winding start command from the winding start unit 45, the printing control unit 43 starts torque control of the winding motor 16. Accordingly, the winding core material 15 starts to rotate.

Figure 11:
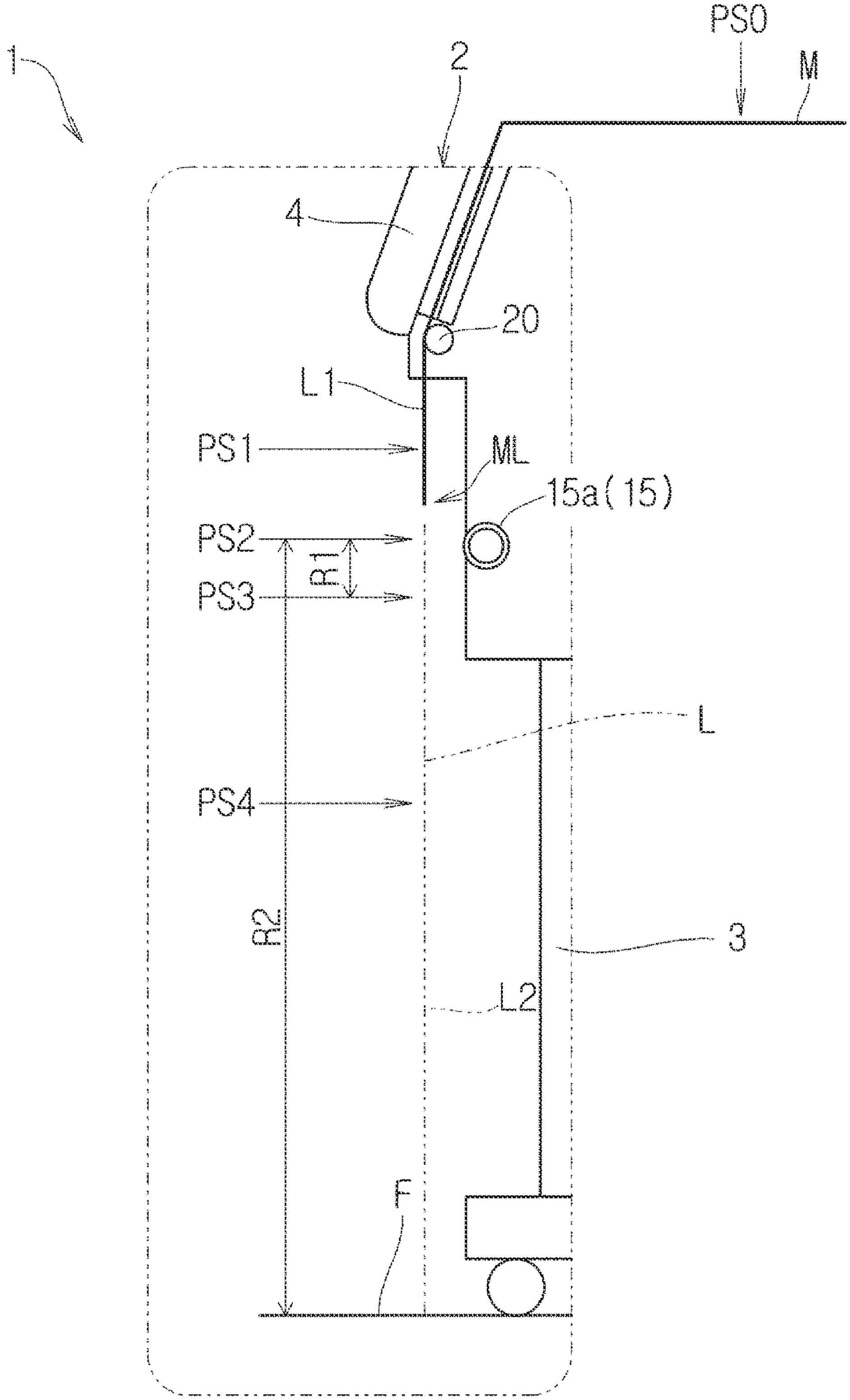
FIG. 11 is a diagram showing a track through which the leading end of the medium can pass during printing.

As described above, the prompting unit 46 and the stopping unit 47 execute a predetermined action depending on a current position of the leading end ML of the medium M. Therefore, hereinafter, with reference to FIG. 11, several terms related to a position of the leading end ML of the medium M are defined in order to express the position of the leading end ML of the medium M that changes every moment. FIG. 11 shows a side view of the printing apparatus 1 after the printing apparatus 1 starts printing and at a time point when several tens of seconds pass since the leading end ML of the medium M passes through the second conveyance roller 20. As shown in FIG. 11, the medium M that passed through the second conveyance roller 20 hangs directly downward as viewed from the second conveyance roller 20 due to an own weight of the medium M. As the printing progresses, the leading end ML of the medium M gradually approaches to the installation floor surface F. In FIG. 11, a track L1 through which the leading end ML of the medium M passed is shown by a bold line, and a track L2 through which the leading end ML of the medium M is to pass from now on is shown by a two-dot chain line. The track L1 and the track L2 constitute a medium conveyance track L. FIG. 11 shows a printing position PS0, a prompting position PS1, a fixing work range R1, an upstream end PS2 of the fixing work range R1, a downstream end PS3 of the fixing work range R1, a stopping range R2, and a stopping position PS4 along the medium conveyance track L. The printing position PS0, the prompting position PS1, the upstream end PS2, the downstream end PS3, and the stopping position PS4 are arranged in this order from upstream to downstream along the medium conveyance track L.

The printing position PS0 is a position where the printing unit 6 performs printing on the medium M. That is, the printing position PS0 is a position where the printing unit 6 ejects ink onto the medium M.

The prompting position PS1 is defined as a position downstream of the printing position PS0. Specifically, the prompting position PS1 is located between the printing position PS0 and the upstream end PS2.

The upstream end PS2 and the downstream end PS3 define the fixing work range R1.

The fixing work range R1 is a range suitable for the user to fix the leading end ML of the medium M to the winding core material 15. The upstream end PS2 and the downstream end PS3 of the fixing work range R1 are defined as follows as an example.

That is, a position of the leading end ML of the medium M when the leading end ML of the medium M almost reaches the outer peripheral surface 15*a* of the winding core material 15 in a case where the leading end ML of the medium M hanging directly downward as viewed from the second conveyance roller 20 is pulled toward the winding core material 15 is defined as the upstream end PS2 of the fixing work range R1.

On the other hand, the downstream end PS3 is defined as a position several tens of centimeters below the upstream end PS2. The several tens of centimeters is typically 20 centimeters to 30 centimeters, but is not limited thereto. When the leading end ML of the medium M is located 70 centimeters below the upstream end PS2, the medium M needs to be folded up in order to fix the leading end ML of the medium M to the outer peripheral surface 15*a* of the winding core material 15, which results in poor workability. Therefore, the downstream end PS3 of the fixing work range R1, which is a range suitable for the user to fix the leading end ML of the medium M to the winding core material 15, is actually defined in view of the workability of the fixing work.

The stopping position PS4 is defined as a position downstream of the upstream end PS2. Specifically, a position of the leading end ML of the medium M after the leading end ML of the medium M reaches the upstream end PS2 of the fixing work range R1 or when the break C1 or the break C2 shown in FIGS. 6 and 7 reaches the printing position PS0 is defined as the stopping position PS4. In the embodiment, the stopping position PS4 is located downstream of the downstream end PS3, and may be located upstream of the downstream end PS3.

The stopping range R2 is defined as a range from the upstream end PS2 to the installation floor surface F. As long as the leading end ML of the medium M that passed through the upstream end PS2 is located within the stopping range R2, the medium M does not come into contact with the installation floor surface F and does not become dirty.

5. Operation Description

Next, the operation of the printing apparatus 1 will be described with reference to FIGS. 12 and 13. First, the user creates a printed image using the application 31 on the computer 30, pulls out the medium M from the paper feeding roll 14, and sets the leading end ML of the medium M at a predetermined position of the main body portion 2. In addition, the user sets the winding core material 15 in the winding unit 11. Then, the user executes the printing instruction on the computer 30. In response to this, the application 31 outputs the image data to the printer driver 32. Then, the printer driver 32 generates the normal printing output data D1 and the intra-page stop printing output data D2, and outputs the normal printing output data D1 and the intra-page stop printing output data D2 to the printing apparatus 1. In the printing apparatus 1, the following control is performed.

First, the operation setting unit 44 outputs the operation setting screen shown in FIG. 9 to the LCD 40*e* (S100). The user inputs the operation conditions of the printing apparatus 1 via the touch panel 40*f*. The operation setting unit 44 stores, in the RAM 40*b*, the operation conditions input by the user.

The prompting unit 46 sets the prompting position PS1 shown in FIG. 11 based on the winding prompting timing set by the user (S110). Specifically, when the winding prompting timing is set to "early", the prompting unit 46 shifts the prompting position PS1 upstream of a reference position. When the winding prompting timing is set to "normal", the prompting unit 46 sets the prompting position PS1 as the reference position. When the winding prompting timing is set to "late", the prompting unit 46 shifts the prompting position PS1 downstream of the reference position. As a result of setting the prompting position PS1 by the prompting unit 46, the prompting position PS1 may be upstream of the second conveyance roller 20, the prompting position PS1 may be closer to the upstream end PS2 of the fixing work range R1 than to the printing position PS0, or the prompting position PS1 may be closer to the printing position PS0 than to the upstream end PS2 of the fixing work range R1.

Next, the printing output data receiving unit 41 receives the normal printing output data D1 and the intra-page stop printing output data D2 from the computer 30 (S120). The printing output data receiving unit 41 stores the received normal printing output data D1 and intra-page stop printing output data D2 in the buffer unit 42.

Next, the printing control unit 43 starts printing based on the normal printing output data D1 or the intra-page stop printing output data D2 (S130). The printing control unit 43 may start the printing based on the normal printing output data D1, or may start the printing based on the intra-page stop printing output data D2. Typically, the printing control unit 43 starts the printing based on the normal printing output data D1. Hereinafter, in the embodiment, the printing control unit 43 starts the printing based on the normal printing output data D1. The winding core material 15 set in the winding unit 11 is not rotated and is stationary at a time point when the printing control unit 43 starts the printing. When the printing control unit 43 starts the printing, the winding start unit 45 causes the LCD 40*e* to display the winding start screen shown in FIG. 10.

Next, the printing control unit 43 determines whether a printing job performed based on the normal printing output data D1 is a winding job requiring winding of the medium M in the winding unit 11 (S140). When the printing control unit 43 determines that the printing job is the winding job, the printing control unit 43 advances the processing to S150. When the printing control unit 43 determines that the printing job is not the winding job, the printing control unit 43 advances the processing to S290.

The above determination by the printing control unit 43 is performed based on a total value of the sub scanning feed amounts in the normal printing output data D1 as an example. That is, when the printing job is such that the leading end ML of the medium M reaches the installation floor surface F before the printing control unit 43 completes the printing job, the printing control unit 43 determines that the printing job is the winding job. Alternatively, the printing control unit 43 may execute the above determination by inquiring of the user whether the printing job is the winding job on the operation setting screen shown in FIG. 9. When the printing job being executed is a printing job intended for test printing, the printing control unit 43 may determine that the printing job is not the winding job.

Next, the prompting unit 46 refers to the RAM 40*b* and determines whether the prompting by the prompting unit 46 is required (S150). When the prompting unit 46 determines that the prompting by the prompting unit 46 is required, the prompting unit 46 advances the processing to S160. On the other hand, when the prompting unit 46 determines that the prompting by the prompting unit 46 is not required, the prompting unit 46 advances the processing to S200.

Next, the prompting unit 46 determines whether the leading end ML of the medium M reaches the prompting position PS1 (S160). When the prompting unit 46 determines that the leading end ML of the medium M does not reach the prompting position PS1, the prompting unit 46 repeats the determination in S160. On the other hand, when the prompting unit 46 determines that the leading end ML of the medium M reaches the prompting position PS1, the prompting unit 46 advances the processing to S170.

Here, the prompting unit 46 can acquire the current position of the leading end ML of the medium M by various methods. That is, the prompting unit 46 can calculate the current position of the leading end ML of the medium M based on a conveyance speed of the medium M and an elapsed time from the start of the printing. In another example, the prompting unit 46 can calculate the current position of the leading end ML of the medium M based on a conveyance distance of the medium M.

Next, the prompting unit 46 determines whether winding in the winding unit 11 is started (S170). When the prompting unit 46 determines that the winding in the winding unit 11 is started, the prompting unit 46 advances the processing to S290. On the other hand, when the prompting unit 46 determines that the winding in the winding unit 11 is not started, the prompting unit 46 advances the processing to S180.

Here, the prompting unit 46 can determine, by various methods, whether the winding in the winding unit 11 is started. As an example, when the user taps the winding start button shown in FIG. 10 before the determination by the prompting unit 46, the prompting unit 46 can determine that the winding in the winding unit 11 is started. In another example, the prompting unit 46 can determine, based on a current value of a current supplied to the winding motor 16, whether the winding in the winding unit 11 is started. In still another example, the prompting unit 46 can determine, based on an output value of an encoder provided in the winding motor 16, whether the winding in the winding unit 11 is started.

Next, the prompting unit 46 outputs the prompting sound signal to the speaker 40*g*, thereby prompting the user to fix the leading end ML of the medium M to the winding core material 15 (S180). As described above, since it takes a certain amount of time for the leading end ML of the medium M to reach the winding core material 15 after the printing by the printing apparatus 1 is started, the user performs another work to spend the time. In this case, the user can recognize the leading end ML of the medium M reaching close to the winding core material 15 by hearing a prompting sound output from the speaker 40*g* at a location away from the printing apparatus 1. In response to this, the user can temporarily interrupt another work, return to the printing apparatus 1, and stand by in front of the printing apparatus 1 until the leading end ML of the medium M reaches the winding core material 15. When the leading end ML of the medium M reaches the outer peripheral surface 15*a* of the winding core material 15, the user fixes the leading end ML of the medium M to the winding core material 15 and causes the winding unit 11 to start winding the medium M through the winding start screen shown in FIG. 10. Therefore, even when the user forgets that the printing is in progress due to devotion in another work, the user can notice that the printing is in progress. Accordingly, the medium M after the printing can be prevented from becoming waste paper due to, for example, the leading end ML of the medium M reaching the installation floor surface F without the medium M being wound by the winding unit 11.

However, it is also conceivable that the user may miss the prompting sound output from the speaker 40*g* at a location away from the printing apparatus 1. Alternatively, under a specific environment in which the prompting sound cannot be played, the user may set on the operation setting screen in FIG. 10 that the prompting by the prompting unit 46 is not required. In this case, there is still a possibility that the user may forget that the printing is in progress due to devotion in another task. In such a case, for example, in order to prevent the medium M after the printing from becoming waste paper due to the leading end ML of the medium M reaching the installation floor surface F without the medium M being wound by the winding unit 11, the stopping unit 47 temporarily stops the conveyance of the medium M by the conveyance unit 18 after the leading end ML of the medium M reaches the upstream end PS2. Specifically, it is as follows.

First, the stopping unit 47 refers to the RAM 40*b* and determines whether the automatic stopping function by which the stopping unit 47 stops the conveyance of the medium M is set to be enabled (S200). When the stopping unit 47 determines that the automatic stopping function of stopping the conveyance of the medium M by the stopping unit 47 is enabled, the stopping unit 47 causes the process to proceed to S210. On the other hand, when the stopping unit 47 determines that the automatic stopping function by which the stopping unit 47 stops the conveyance of the medium M is disabled, the stopping unit 47 advances the processing to S290.

Next, the stopping unit 47 refers to the normal printing output data D1 or the intra-page stop printing output data D2, and determines whether there is a break reaching the printing position PS0 while the leading end ML of the medium M is within the stopping range R2 (S210). Here, the break indicates, for example, the break C1 or the break C2 shown in FIG. 7. When the stopping unit 47 determines that there is a break reaching the printing position PS0 while the leading end ML of the medium M is within the stopping range R2, the stopping unit 47 advances the processing to S220. On the other hand, when the stopping unit 47 determines that there is no break reaching the printing position PS0 while the leading end ML of the medium M is within the stopping range R2, the stopping unit 47 advances the processing to S400 in FIG. 13. The break C1 shown in FIG. 7 may not be the break described here, and the break C2 may be the break described here.

Next, the stopping unit 47 sets the stopping position PS4 based on the normal printing output data D1 or the intra-page stop printing output data D2 (S220).

Specifically, when only the break C1 reaches the printing position PS0 while the leading end ML of the medium M is within the stopping range R2, the stopping unit 47 sets the stopping position PS4 to a position of the leading end ML of the medium M at a time point when the break C1 reaches the printing position PS0. In this case, the printing control unit 43 continues the printing based on the intra-page stop printing output data D2. Accordingly, even when the printing is interrupted at the time point when the break C1 reaches the printing position PS0, the remarkable deterioration in printing quality as described above can be prevented.

When only the break C2 reaches the printing position PS0 while the leading end ML of the medium M is within the stopping range R2, the stopping unit 47 sets the stopping position PS4 to a position of the leading end ML of the medium M at a time point when the break C2 reaches the printing position PS0. In this case, the printing control unit 43 continues the printing based on the normal printing output data D1 thereafter.

When both the break C1 and the break C2 reach the printing position PS0 while the leading end ML of the medium M is within the stopping range R2, the stopping unit 47 sets the stopping position PS4 to the position of the leading end ML of the medium M at the time point when the break C2 reaches the printing position PS0. In this case, the printing control unit 43 continues the printing based on the normal printing output data D1 thereafter.

Next, the stopping unit 47 determines whether the leading end ML of the medium M reaches the upstream end PS2 (S230). When the stopping unit 47 determines that the leading end ML of the medium M reaches the upstream end PS2, the stopping unit 47 advances the process to S240. On the other hand, when the stopping unit 47 determines that the leading end ML of the medium M does not reach the upstream end PS2, the stopping unit 47 repeats the processing in S230.

Here, similar to the prompting unit 46, the stopping unit 47 can acquire the current position of the leading end ML of the medium M by various methods. A specific method is as described above.

Next, the stopping unit 47 determines whether the winding in the winding unit 11 is started (S240). When the stopping unit 47 determines that the winding in the winding unit 11 is started, the stopping unit 47 advances the process to S290. On the other hand, when the stopping unit 47 determines that the winding in the winding unit 11 is not started, the stopping unit 47 advances the processing to S250.

Here, similar to the prompting unit 46, the stopping unit 47 can determine, by various methods, whether the winding in the winding unit 11 is started. A specific method is as described above.

Next, the stopping unit 47 determines whether the leading end ML of the medium M reaches the stopping position PS4 (S250). When the stopping unit 47 determines that the leading end ML of the medium M reaches the stopping position PS4, the stopping unit 47 advances the process to S260. On the other hand, when the stopping unit 47 determines that the leading end ML of the medium M does not reach the stopping position PS4, the stopping unit 47 returns the processing to S240.

Next, the stopping unit 47 interrupts the printing by stopping the conveyance of the medium M by the conveyance unit 18 (S260). The medium M is conveyed intermittently every time the main scanning pass is executed. Therefore, stopping the conveyance of the medium M means prohibiting the intermittent conveyance of the medium M.

Here, when the leading end ML of the medium M can be fixed to the winding core material 15 at a time point when the stopping unit 47 interrupts the printing, the medium M after the printing can be prevented from becoming waste paper. When the leading end ML of the medium M cannot be fixed to the winding core material 15 at the time point when the stopping unit 47 interrupts the printing, or when the leading end ML of the medium M reaches the installation floor surface F and the medium M becomes dirty at the time point when the stopping unit 47 interrupts the printing, the printing can be stopped at least at the time point when the break C2 reaches the printing position PS0, and thus the amount of waste paper can be reduced. In either case, it can be said that this contributes to saving of the medium M.

At this time, even when the printing is interrupted and then resumed since the break C1 or the break C2 is located at the printing position PS0, high printing quality can be achieved. Therefore, even when the printing is interrupted, there is still room to resume printing.

Particularly, when the break C1 is located at the printing position PS0 and the dimension of the head 8 in the sub scanning direction is larger than the dimension of the break C1 in the sub scanning direction, the printing control unit 43 executes the printing using the intra-page stop printing output data D2. Therefore, the printing on the lower end portion G11*b* of the printed image G11 is completed before the printing on the upper end portion G12*a* of the printed image G12 is started. Similarly, the printing on the upper end portion G12*a* of the printed image G12 starts after the printing on the lower end portion G11*b* of the printed image G11 is completed. Therefore, as described above, even when the conveyance of the medium M is stopped at the timing when the break C1 reaches the printing position PS0 in the printing unit 6, the printing in which the liquid ink is newly superimposed on the ink that is already dried is not performed on the lower end portion G11*b* of the printed image G11 and the upper end portion G12*a* of the printed image G12. In this sense, even when the printing is interrupted and then resumed, the high printing quality can be achieved.

Next, the stopping unit 47 determines whether the winding in the winding unit 11 is started (S270). When the stopping unit 47 determines that the winding in the winding unit 11 is started, the stopping unit 47 advances the processing to S280. On the other hand, when the stopping unit 47 determines that the winding in the winding unit 11 is not started, the stopping unit 47 repeats the processing in S270.

Next, the stopping unit 47 resumes the printing by resuming the conveyance of the medium M by the conveyance unit 18 (S280).

Next, the printing control unit 43 determines whether the printing job currently being executed is completed (S290). When the printing control unit 43 determines that the printing job currently being executed is completed, the printing control unit 43 ends the processing. On the other hand, when the printing control unit 43 determines that the printing job currently being executed is not completed, the printing control unit 43 repeats the processing in S290. When the printing is completed, the user cuts the medium M and collects the winding roll 17 from the printing apparatus 1.

Figure 13:
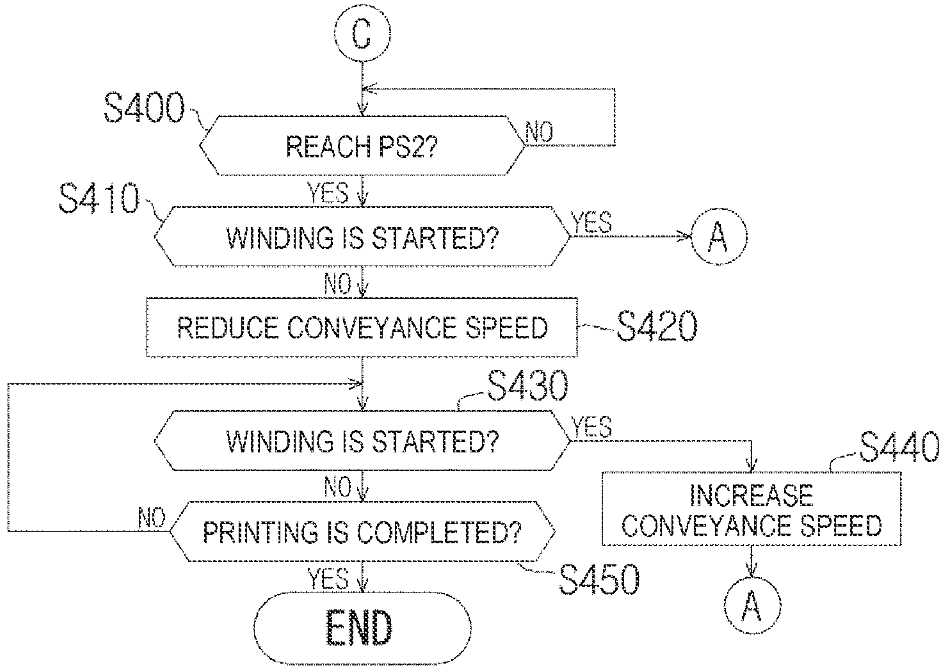
FIG. 13 is a control flow of the printing apparatus.

Next, referring to FIG. 13, the stopping unit 47 determines whether the leading end ML of the medium M reaches the upstream end PS2 (S400). When the stopping unit 47 determines that the leading end ML of the medium M reaches the upstream end PS2, the stopping unit 47 advances the processing to S410. On the other hand, when the stopping unit 47 determines that the leading end ML of the medium M does not reach the upstream end PS2, the stopping unit 47 repeats the processing in S400.

Next, the stopping unit 47 determines whether the winding in the winding unit 11 is started (S410). When the stopping unit 47 determines that the winding in the winding unit 11 is started, the stopping unit 47 advances the processing to S290 in FIG. 12. On the other hand, when the stopping unit 47 determines that the winding in the winding unit 11 is not started, the stopping unit 47 advances the processing to S420.

Next, the stopping unit 47 reduces the conveyance speed of the medium M by the conveyance unit 18 (S420). Since the conveyance unit 18 conveys the medium M intermittently, the stopping unit 47 substantially reduces the conveyance speed of the medium M by the conveyance unit 18 by providing a predetermined interval between the main scanning and the sub scanning as an example. Accordingly, it is possible to extend the time until the user performs the winding.

Next, the stopping unit 47 determines whether the winding in the winding unit 11 is started (S430). When the stopping unit 47 determines that the winding in the winding unit 11 is started, the stopping unit 47 advances the processing to S440. On the other hand, when the stopping unit 47 determines that the winding in the winding unit 11 is not started, the stopping unit 47 advances the processing to S450.

In S440, the stopping unit 47 increases the conveyance speed of the medium M by the conveyance unit 18 (S440). For example, the stopping unit 47 substantially increases the conveyance speed of the medium M by the conveyance unit 18 by removing the predetermined interval provided between the main scanning and the sub scanning. Then, the stopping unit 47 returns the processing to S290 in FIG. 12.

In S450, the printing control unit 43 determines whether the printing job currently being executed is completed (S450). When the printing control unit 43 determines that the printing job currently being executed is completed, the printing control unit 43 ends the processing. On the other hand, when the printing control unit 43 determines that the printing job currently being executed is not completed, the printing control unit 43 returns the processing to S430. When the printing is completed, the user cuts the medium M and collects the winding roll 17 from the printing apparatus 1.

The embodiment of the present disclosure has been described above. The above embodiment has the following features.

6. Technique Characterized by Prompting Unit 46

For example, as shown in FIGS. 2, 5, 11, and 12, the printing apparatus 1 includes the printing unit 6 that performs printing on the medium M, the conveyance unit 18 that conveys the medium M, the winding unit 11 that rotatably supports the winding core material 15 for winding up the medium M after printing, and the prompting unit 46 that prompts the user to fix the leading end ML of the medium M to the winding core material 15 in response to the leading end ML of the medium M reaching the prompting position PS1 located downstream of the printing position PS0 in the printing unit 6. According to the above configuration, even when the user forgets that the printing is in progress due to devotion in another work, the user can notice that the printing is in progress. Accordingly, the medium M after the printing can be prevented from becoming waste paper due to, for example, the leading end ML of the medium M reaching the installation floor surface F without the medium M being wound by the winding unit 11.

As shown in FIG. 11, the prompting position PS1 may be located downstream of the upstream end PS2 of the fixing work range R1 suitable for the user to fix the leading end ML of the medium M to the winding core material 15, but is preferably located upstream of the upstream end PS2. According to the above configuration, the user can fix the leading end ML of the medium M to the winding core material 15 with more margin, compared to a case where the prompting position PS1 is located downstream of the upstream end PS2.

As shown in FIG. 11, the prompting position PS1 is closer to the upstream end PS2 of the fixing work range R1 than to the printing position PS0. According to the above configuration, compared to a case where the prompting position PS1 is closer to the printing position PS0 than to the upstream end PS2 of the fixing work range R1, a time during which the user waits in front of the printing apparatus 1 after the user is called by the printing apparatus 1 can be shortened, which contributes to effective use of time.

Figure 12:
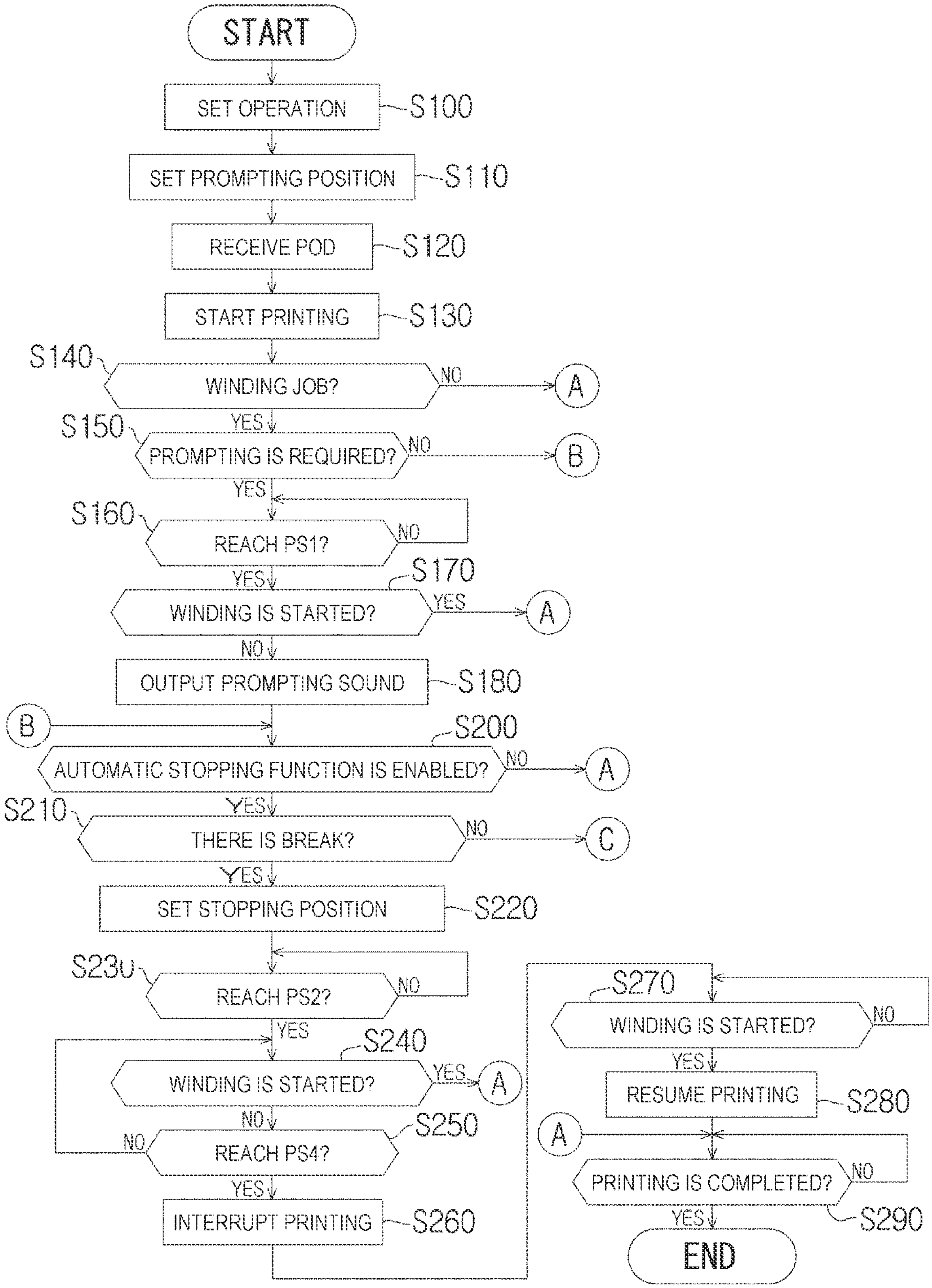
FIG. 12 is a control flow of the printing apparatus.

As shown in FIG. 12, the prompting unit 46 executes the prompting (S140: YES, S180) when executing the job requiring the winding in the winding unit 11, and does not execute the prompting (S140: NO) when executing the job not requiring the winding in the winding unit 11. According to the above configuration, the prompting can be appropriately executed depending on whether the winding is required.

As shown in FIG. 12, the prompting unit 46 executes the prompting (S170: NO, S180) when the winding in the winding unit 11 is not yet started, and does not execute the prompting (S170: YES) when the winding in the winding unit 11 is already started. In other words, the prompting unit 46 executes the prompting (S170: NO, S180) before the winding is performed by the winding unit 11, and does not execute the prompting (S170: YES) when the winding is already performed by the winding unit 11. According to the above configuration, an unnecessary prompting sound can be eliminated.

Further, as shown in FIG. 12, the prompting unit 46 executes the prompting when the user sets that the prompting by the prompting unit 46 is required (S150: YES, S180), and does not execute the prompting when the user sets that the prompting by the prompting unit 46 is not required (S150: NO). According to the above configuration, the printing apparatus 1 can be used even under a special environment in which the prompting sound is prohibited.

The prompting unit 46 executes the prompting by outputting the prompting sound signal. According to the above configuration, the prompting unit 46 can also prompt the user working at a location away from the printing apparatus 1. Alternatively, the prompting unit 46 may perform the prompting by intermittently moving a movable unit of the printing apparatus 1 to generate some kind of operation sound. Typically, examples of the movable unit of the printing apparatus 1 include the printing unit 6 and the winding core material 15.

The prompting unit 46 may determine, based on the conveyance speed of the medium M and the elapsed time, whether the leading end ML of the medium M reaches the prompting position PS1. According to the above configuration, it is possible to inexpensively determine whether the leading end ML of the medium M reaches the prompting position PS1 without providing a large number of optical sensors for detecting the position of the leading end ML of the medium M in the printing apparatus 1. The elapsed time is typically an elapsed time from the start of the printing.

The prompting unit 46 may determine, based on the conveyance distance of the medium M, whether the leading end ML of the medium M reaches the prompting position PS1. According to the above configuration, similar to the above, it is possible to inexpensively determine whether the leading end ML of the medium M reaches the prompting position PS1. The conveyance distance is typically a conveyance distance from the start of the printing.

As shown in FIGS. 5 and 12, the printing apparatus 1 further includes the stopping unit 47 that stops the conveyance of the medium M by the conveyance unit 18 in response to the break of the printed image reaching the printing position PS0 after the leading end ML of the medium M reaches the upstream end PS2 of the fixing work range R1 suitable for the user to fix the leading end ML of the medium M to the winding core material 15. According to the above configuration, when the leading end ML of the medium M can be fixed to the winding core material 15 at the time point when the stopping unit 47 interrupts the printing, the medium M after the printing can be prevented from becoming waste paper. Even when the leading end ML of the medium M cannot be fixed to the winding core material 15 at the time point when the stopping unit 47 interrupts the printing, or even when the leading end ML of the medium M reaches the installation floor surface F at the time point when the stopping unit 47 interrupts the printing and the medium M becomes dirty, the amount of waste paper can be reduced. In either case, it can be said that this contributes to saving of the medium M.

As shown in FIG. 12, the stopping unit 47 stops the conveyance when the winding in the winding unit 11 is not yet started (S240: NO), and does not stop the conveyance when the winding in the winding unit 11 is already started (S240: YES). In other words, the stopping unit 47 stops the conveyance before the winding is performed by the winding unit 11 (S240: NO), and does not stop the conveyance when the winding is already performed by the winding unit 11 (S240: YES). According to the above configuration, unnecessary stop of the conveyance can be eliminated.

As shown in FIG. 12, a method for producing a printed matter includes prompting the user to fix the leading end ML of the medium M to the winding core material 15 in response to the leading end ML of the medium M reaching the prompting position PS1 located downstream of the printing position PS0 in the printing unit 6 (S180). According to the above method, even when the user forgets that the printing is in progress due to devotion in another work, the user can notice that the printing is in progress. Accordingly, the medium M after the printing can be prevented from becoming waste paper due to, for example, the leading end ML of the medium M reaching the installation floor surface F without the medium M being wound by the winding unit 11.

As shown in FIG. 12, the method for producing a printed matter may further include starting printing (S130) and prompting the user (S180).

7. Technique Characterized by Stopping Unit 47

For example, as shown in FIGS. 2, 5, 11, and 12, the printing apparatus 1 includes the printing unit 6 that performs printing on the medium M, the conveyance unit 18 that conveys the medium M, the winding unit 11 that rotatably supports the winding core material 15 for winding up the medium M after printing, and the stopping unit 47 that stops the conveyance of the medium M by the conveyance unit 18 in response to the break of the printed image reaching the printing position PS0 in the printing unit 6 after the leading end ML of the medium M reaches the upstream end PS2 of the fixing work range R1 suitable for the user to fix the leading end ML of the medium M to the winding core material 15. According to the above configuration, when the leading end ML of the medium M can be fixed to the winding core material 15 at the time point when the stopping unit 47 interrupts the printing, the medium M after the printing can be prevented from becoming waste paper. Even when the leading end ML of the medium M cannot be fixed to the winding core material 15 at the time point when the stopping unit 47 interrupts the printing, or even when the leading end ML of the medium M reaches the installation floor surface F at the time point when the stopping unit 47 interrupts the printing and the medium M becomes dirty, the amount of waste paper can be reduced. In either case, it can be said that this contributes to saving of the medium M. Even when the printing is interrupted and then resumed since the break C1 or the break C2 is located at the printing position PS0 at the time point when the stopping unit 47 stops the conveyance of the medium M, the high printing quality can be achieved. Therefore, even when the printing is interrupted, there is still room to resume printing.

As shown in FIG. 12, the stopping unit 47 stops the conveyance when executing the job requiring the winding in the winding unit 11 (S140: YES, S260), and does not stop the conveyance when executing the job not requiring the winding in the winding unit 11 (S140: NO). According to the above configuration, the conveyance can be appropriately stopped depending on whether the winding is required.

As shown in FIG. 12, the stopping unit 47 stops the conveyance when the winding in the winding unit 11 is not yet started (S240: NO, S260), and does not stop the conveyance when the winding in the winding unit 11 is already started (S240: YES). In other words, the stopping unit 47 stops the conveyance before the winding is performed by the winding unit 11 (S240: NO), and does not stop the conveyance when the winding is already performed by the winding unit 11 (S240: YES). According to the above configuration, unnecessary stop of the conveyance can be eliminated.

As shown in FIG. 12, the stopping unit 47 stops the conveyance when the user sets that the stop by the stopping unit 47 is required (S200: YES, S260), and does not stop the conveyance when the user sets that the stop by the stopping unit 47 is not required (S200: NO). According to the above configuration, a flexible operation of the printing apparatus 1 can be implemented.

As shown in FIGS. 11, 12, and 13, after the leading end ML of the medium M reaches the upstream end PS2 of the fixing work range R1 and when there is no break reaching the printing position PS0 while the leading end ML of the medium M is within the predetermined stopping range R2 going downstream from the upstream end PS2 of the fixing work range R1 (S210: NO), the stopping unit 47 reduces the conveyance speed of the medium M by the conveyance unit 18 at a predetermined timing (S420). According to the above configuration, there is a high possibility that the user can fix the leading end ML of the medium M to the winding core material 15 before the leading end ML of the medium M reaches the installation floor surface F. Therefore, there is a possibility that the medium M after the printing is prevented from becoming waste paper, and as a result, this contributes to saving of the medium M.

As shown in FIG. 11, the downstream end of the predetermined stopping range R2 is the installation floor surface F. Alternatively, the downstream end of the predetermined stopping range R2 may be set above the installation floor surface F.

As shown in FIG. 13, the predetermined timing is a timing at which the leading end ML of the medium M reaches the upstream end PS2 of the fixing work range R1 (S400: YES). Alternatively, the predetermined timing may be set before or after the timing at which the leading end ML of the medium M reaches the upstream end PS2 of the fixing work range R1.

As shown in FIGS. 7 and 8, the break C1 and the break C2 are areas in which printing is not performed over the entire area in the main scanning direction.

As an example, the break C2 is located between the lower end G1*d* of the printed image G1 in the first printing page P1 and the upper end G2*u* of the printed image G2 in the second printing page P2.

As an example, as shown in FIGS. 7 and 8, when the printed image G1 and the printed image G2 are disposed to be separated from each other in the conveyance direction of the medium M in the same page, the break C1 is located between the printed image G1 and the printed image G2.

As shown in FIGS. 7 and 8, when the stopping unit 47 stops the conveyance of the medium M (S260), the printing control unit 43 executes the lower end processing DP on the printed image adjacent upstream to the break, and executes the upper end processing UP on the printed image adjacent downstream to the break. Specifically, as shown in FIG. 8, the printing control unit 43 executes the lower end processing DP on the lower end portion G11*b* of the printed image G11 adjacent upstream to the break C1, and executes the upper end processing UP on the upper end portion G12*a* of the printed image G12 adjacent downstream to the break C1. Similarly, the printing control unit 43 executes the lower end processing DP on the lower end portion G12*b* of the printed image G12 adjacent upstream to the break C2, and executes the upper end processing UP on the upper end portion G2*a* of the printed image G2 adjacent downstream to the break C2. According to the above configuration, the high printing quality can be achieved.

As shown in FIG. 12, the method for producing a printed matter includes stopping the conveyance of the medium M by the conveyance unit 18 (S260) in response to the break of the printed image reaching the printing position PS0 in the printing unit 6 after the leading end ML of the medium M reaches the upstream end PS2 of the fixing work range R1 suitable for the user to fix the leading end ML of the medium M to the winding core material 15. According to the above method, when the leading end ML of the medium M can be fixed to the winding core material 15 at the time point when the stopping unit 47 interrupts the printing, the medium M after the printing can be prevented from becoming waste paper. Even when the leading end ML of the medium M cannot be fixed to the winding core material 15 at the time point when the stopping unit 47 interrupts the printing, or even when the leading end ML of the medium M reaches the installation floor surface F at the time point when the stopping unit 47 interrupts the printing and the medium M becomes dirty, the amount of waste paper can be reduced. In either case, it can be said that this contributes to saving of the medium M. Even when the printing is interrupted and then resumed since the break C1 or the break C2 is located at the printing position PS0 at the time point when the stopping unit 47 stops the conveyance of the medium M, the high printing quality can be achieved. Therefore, even when the printing is interrupted, there is still room to resume printing.

As shown in FIG. 12, the method for producing a printed matter may further include starting printing (S130) and stopping the conveyance of the medium M by the conveyance unit 18 (S260).

8. Modification

Although the embodiment of the present disclosure has been described above, the above embodiment can be modified as follows.

That is, in the above embodiment, the printing apparatus 1 receives the normal printing output data D1 and the intra-page stop printing output data D2 from the computer 30, and properly uses the normal printing output data D1 and the intra-page stop printing output data D2 according to a situation. However, the normal printing output data D1 can be omitted. That is, in any situation, the printing control unit 43 may execute the printing based on the intra-page stop printing output data D2. In this case, the printing can be interrupted while maintaining high printing quality at any of a time point when the break C1 reaches the printing position PS0 and a time point when the break C2 reaches the printing position PS0.

The stopping unit 47 may stop the conveyance of the medium M in response to the leading end ML of the medium M reaching the installation floor surface F. In this case, although high printing quality cannot be expected even when the printing is resumed, an amount of waste paper can be reliably reduced.

When stopping the conveyance of the medium M, the stopping unit 47 may output an alarm sound signal to the speaker 40*g*. According to the above configuration, the printing apparatus 1 can be prevented from being left for a long time in a state where the printing is interrupted.

The prompting of the prompting unit 46 and the warning of the stopping unit 47 may be performed in any manner. The prompting and the warning may be performed by sound using the speaker 40*g*, may be performed by light using a lamp, or may be performed by notifying the computer 30 that generates image data or a smartphone owned by a user using the communication interface 40*d*.

A member described as a separate member in the above example may be a single member, or a member described as a single member may be a plurality of members.

In the above example, the program can be stored using various types of non-transitory computer readable media and supplied to a computer. The non-transitory computer readable medium includes various types of tangible storage media. Examples of the non-transitory computer readable medium include a magnetic recording medium (for example, a flexible disk, a magnetic tape, or a hard disk drive) and a magneto-optical recording medium (for example, a magneto-optical disk). Examples of the non-transitory computer readable medium further include a read only memory (CD-ROM), a CD-R, a CD-R/W, and a semi-conductor memory (for example, a mask ROM). Examples of the non-transitory computer readable medium further include a programmable ROM (PROM), an erasable PROM (EPROM), a flash ROM, and a random access memory (RAM). The program may be supplied to the computer by various types of transitory computer readable media. Examples of the transitory computer readable medium include an electric signal, an optical signal, and an electromagnetic wave. The transitory computer readable medium can supply a program to the computer via a wired communication path such as an electric wire and an optical fiber or a wireless communication path.

What is claimed is:

1. A printing apparatus comprising:

a printing unit configured to perform printing on a medium at a printing position in the printing unit;

a conveyance unit configured to convey the medium along a conveyance path;

a winding unit configured to wind up the medium; and a processor configured to determine whether a leading end of the medium reaches a predetermined range during conveyance of the medium while the printing is being performed, determine whether the leading end of the medium reaches a predetermined position disposed downstream relative to an upstream end of the predetermined range along the conveyance path during the conveyance of the medium while the printing is being performed, with the predetermined position corresponding to a position of the leading end of the medium when a break of a printed image on the medium reaches the printing position in the printing unit, and stop the conveyance of the medium in response to determining that the leading end of the medium reaches the predetermined position after determining that the leading end of the medium reaches the predetermined range, wherein when the processor stops the conveyance, lower end processing is executed on a printed image adjacent upstream to the break, and upper end processing is executed on a printed image adjacent downstream to the break.

2. The printing apparatus according to claim 1, wherein the processor is configured to stop the conveyance when executing a job requiring winding in the winding unit, and the processor is configured not to stop the conveyance when executing a job not requiring the winding in the winding unit.

3. The printing apparatus according to claim 1, wherein the processor is configured to stop the conveyance before winding is performed by the winding unit at a timing when the leading end of the medium reaches a stopping position, and the processor is configured not to stop the convey ance when the winding is already performed by the winding unit at the timing when the leading end of the medium reaches the stopping position.

4. The printing apparatus according to claim 1, wherein the processor is configured to stop the conveyance when a user sets that a stop operation to stop the conveyance by the processor is required, and the processor is configured not to stop the convey ance when the user sets that the stop operation to stop the conveyance by the processor is not required.

5. The printing apparatus according to claim 1, wherein when the break reaching the printing position is not present while the leading end of the medium is within a predetermined stopping range, the processor is configured to reduce a conveyance speed of the medium by the conveyance unit.

6. The printing apparatus according to claim 5, wherein a downstream end of the predetermined stopping range is an installation floor surface.

7. The printing apparatus according to claim 5, wherein when the break reaching the printing position is not present while the leading end of the medium is within the predetermined stopping range, the processor is configured to reduce the conveyance speed at a timing when the leading end of the medium reaches the upstream end of the predetermined range.

8. The printing apparatus according to claim 1, wherein the break is an area in which printing is not performed over an entire area in a main scanning direction.

9. The printing apparatus according to claim 8, wherein the break is located between a lower end of a printed image in a first printing page and an upper end of a printed image in a second printing page.

10. The printing apparatus according to claim 8, wherein when at least two printed images are disposed to be separated from each other in a conveyance direction of the medium in a same page, the break is located between the at least two printed images.

11. A method for producing a printed matter by performing printing on a medium using a printing apparatus, the printing apparatus including a printing unit configured to perform printing on the medium at a printing position in the printing unit, a conveyance unit configured to convey the medium along a conveyance path, and a winding unit configured to wind up the medium, the method comprising:

determining whether a leading end of the medium reaches a predetermined range during conveyance of the medium while the printing is being performed, determining whether the leading end of the medium reaches a predetermined position disposed downstream relative to an upstream end of the predetermined range along the conveyance path during the conveyance of the medium while the printing is being performed, with the predetermined position corresponding to a position of the leading end of the medium when a break of a printed image on the medium reaches the printing position in the printing unit, and stopping the conveyance of the medium in response to determining that the leading end of the medium reaches the predetermined position after determining that the leading end of the medium reaches the predetermined range, wherein upon stopping the conveyance, lower end processing is executed on a printed image adjacent upstream to the break, and upper end processing is executed on a printed image adjacent downstream to the break.

* * * * *